United States Patent
Togashi

(10) Patent No.: US 6,721,492 B1
(45) Date of Patent: Apr. 13, 2004

(54) SIGNAL PROCESSING APPARATUS AND METHOD, RECORDING APPARATUS, PLAYBACK APPARATUS, RECORDING AND PLAYBACK APPARATUS, AND STREAM PROCESSING APPARATUS AND METHOD

(75) Inventor: Haruo Togashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/418,265

(22) Filed: Oct. 14, 1999

(30) Foreign Application Priority Data

Oct. 16, 1998 (JP) .......................................... 10-295208

(51) Int. Cl.[7] .................................................. H04N 7/26
(52) U.S. Cl. .............................. 386/109; 386/6; 386/68; 386/81
(58) Field of Search ................................ 386/2, 3, 6, 7, 386/68, 81, 109, 113

(56) References Cited

U.S. PATENT DOCUMENTS

| | | | |
|---|---|---|---|
| 5,434,677 A | * | 7/1995 | Oikawa .......................... 386/74 |
| 5,537,215 A | * | 7/1996 | Niimura et al. ............... 386/111 |
| 5,583,650 A | * | 12/1996 | Lane et al. ..................... 386/81 |
| 5,691,819 A | * | 11/1997 | Uchida et al. ................ 386/109 |

FOREIGN PATENT DOCUMENTS

| | | |
|---|---|---|
| EP | 0 541 029 | 5/1993 |
| EP | 0 551 672 | 7/1993 |
| EP | 0 600 690 | 6/1994 |
| EP | 0 690 619 | 1/1996 |
| EP | 0 765 090 | 3/1997 |

* cited by examiner

Primary Examiner—Vincent Boccio
Assistant Examiner—James A Fletcher
(74) Attorney, Agent, or Firm—Frommer Lawrence & Haug LLP; William S. Frommer; Glenn F. Savit

(57) ABSTRACT

In order to obtain a high-quality image when an encoded stream which is encoded using MPEG is played back at variable speed, a stream conversion apparatus is provided which converts an arrangement of DCT coefficients of a source encoded stream into an arrangement suitable for variable-speed playback. Specifically, a header part is separated from an elementary stream of MPEG, and DCT coefficients arranged from a low order of a spatial frequency to a high order are extracted by zigzag scan at intervals of a plurality of DCT blocks which form a macro block. These DCT coefficients are rearranged from a low order to a high order across a plurality of DCT blocks. The DCT coefficients rearranged in this manner are packed into a stream, and the separated header part is added, forming a converted elementary stream. This converted elementary stream is recorded. During high-speed playback, even if there is an error in the middle of the macro block, since decoding is possible using a low-order DCT coefficient, high-quality image video data can be obtained.

14 Claims, 11 Drawing Sheets

FIG. 2

|  | 8 TRACKS / FRAME | 8 TRACKS / FRAME |
|---|---|---|
| SEGMENT | 1 1 2 2 3 3 4 4 | 1 1 2 2 3 3 4 4 |
| TRACK No. | 0 1 0 1 0 1 0 1 | 1 0 1 0 1 0 1 0 |
| TRACK SEQUENCE | 0 0 0 0 0 0 0 0 | 1 1 1 1 1 1 1 1 |

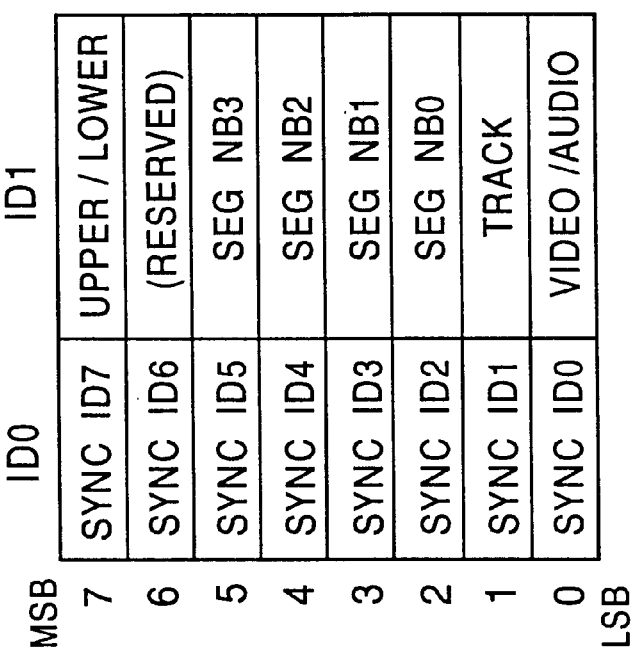
FIG. 5A / FIG. 5B / FIG. 5C

SIGNAL PROCESSING APPARATUS AND METHOD, RECORDING APPARATUS, PLAYBACK APPARATUS, RECORDING AND PLAYBACK APPARATUS, AND STREAM PROCESSING APPARATUS AND METHOD

BACKGROUND OF THE INVENTION

1. Field of the Invention

The present invention relates to a signal processing apparatus and method, a recording apparatus, a playback apparatus, and a recording and playback apparatus, which are capable of most effectively performing decoding by data which can be played back even if there is a loss of video data which is played back from a recording medium when video data which is compressed and coded, and recorded by using DCT (Discrete Cosine Transform) is played back at variable speed.

2. Description of the Related Art

In recent years, several formats used for recording digital video signals in a recording medium and for transmitting digital video signals by using a network have been provided. Generally, since digital video signals require a very large amount of data, when these signals are to be recorded in a recording medium for a long time, it is necessary to compress and code them. As a typical compression coding method, an MPEG (Moving Picture Experts Group) method is known.

The MPEG method is a compression coding method of a hybrid method in which motion compensation predicative coding and coding by DCT (Discrete Cosine Transform) are combined. That is, initially, redundancy in the direction of the time axis is reduced by calculating a difference among frames of a video signal. Next, redundancy in the direction of the space axis is reduced by using DCT. These make it possible to perform efficient coding.

In the MPEG method, one screen is divided into macro blocks composed of, for example, 16 pixels×16 lines, and the macro block is further divided into DCT blocks composed of, for example, 8 pixels×8 lines. For example, when the format of a video signal conforms to the NTSC method, in accordance with the ratio of each signal component, four DCT blocks of a luminance signal Y and two DCT blocks each of color signals Cr and Cb are formed. DCT is performed in units of these DCT blocks. Then, the DCT coefficient obtained by DCT is arranged from the DC components and the low-frequency components to the high frequencies components for each DCT block by zigzag scan, and this is performed on each of the DCT blocks which constitute a macro block.

In the meantime, as a recording medium for recording video signals, a magnetic tape is commonly used. Recording of video signals onto a magnetic tape is performed in such a way that what are commonly called "helical tracks", which are inclined obliquely to the direction of tape movement, are formed by a magnetic head (rotary head) provided on a rotating drum. During playback, helical tracks formed during recording are accurately traced by the rotary head.

By making the tape movement speed during playback, higher than that during recording, for example, playback of 2x speed, 3x speed, or search can be performed. In this case, the trace angle of the rotary head on the tape becomes different from the inclination axis of the helical tracks. For this reason, it is not possible to trace all the signals recorded on the helical tracks. That is, during high-speed playback, playback is performed in which a part of each helical track is scanned, for example.

In a case in which compression coding is performed using MPEG and the data is recorded on a tape-like recording medium, when high-speed playback, such as the above-mentioned search, is performed, only a part of each helical track is traced. For this reason, for example, in a case in which the data of the second half in the above-mentioned macro block cannot be obtained, only DCT blocks of parts corresponding to the first half of the macro block can be used, causing a considerable decrease in image quality. In this manner, conventionally, there is a problem in that it is difficult to effectively use played-back data in order to obtain a high-quality playback image.

SUMMARY OF THE INVENTION

Accordingly, an object of the present invention is to provide a signal processing apparatus and method, a recording apparatus, a playback apparatus, and a recording and playback apparatus, which are capable of obtaining a high-quality image even if high-speed playback is performed during playback when a magnetic tape in which data is recorded on helical tracks by performing compression coding using MPEG is played back.

To achieve the above-mentioned object, according to a first aspect of the present invention, there is provided a signal processing apparatus for dividing each frame contained in video data into a plurality of macro blocks and for performing DCT on each of a plurality of DCT blocks contained in each divided macro block in order to create DCT coefficient data, the signal processing apparatus comprising conversion means for rearranging the arrangement of DCT coefficient data which is coded independently for each DCT block into the sequence from the low-order coefficient data having a low spatial frequency to the high-order coefficient data having a high spatial frequency in such a manner as to extend across a plurality of the DCT blocks within a macro block.

According to a second aspect of the present invention, there is provided a signal processing apparatus for processing DCT coefficient data which is created in such a way that each frame contained in video data is divided into a plurality of macro blocks and DCT is performed on each of a plurality of DCT blocks contained in each divided macro block, the signal processing apparatus comprising conversion means for rearranging the arrangement of the DCT coefficient data arranged in the sequence from low-order DCT coefficient data into the coefficient data of a high order in such a manner as to extend across a plurality of DCT blocks within a macro block into the sequence from the low-order coefficient data to the high-order coefficient data independently for each of the DCT blocks.

According to a third aspect of the present invention, there is provided a signal processing method for dividing each frame contained in video data into a plurality of macro blocks and for performing DCT on each of a plurality of DCT blocks contained in each macro block in order to create DCT coefficient data, the signal processing method comprising: a conversion step for rearranging the arrangement of DCT coefficient data which is coded independently for each DCT block into the sequence from the coefficient data of a low order to the coefficient data of a high order in such a manner as to extend across a plurality of the DCT blocks within a macro block.

According to a fourth aspect of the present invention, there is provided a signal processing method for processing DCT coefficient data which is created in such a way that each frame contained in video data is divided into a plurality of macro blocks and DCT is performed on each of a plurality of DCT blocks contained in each divided macro block, the signal processing method comprising: a conversion step for rearranging independently for each of the DCT blocks, the arrangement of the DCT coefficient data arranged in the sequence from low-order DCT coefficient data into the coefficient data of a high order in such a manner as to extend across a plurality of DCT blocks within a macro block into the sequence from the low-order coefficient data to the high-order coefficient data.

According to a fifth aspect of the present invention, there is provided a recording apparatus for recording DCT coefficient data which is created in such a way that each frame contained in video data is divided into a plurality of macro blocks and DCT is performed on each of a plurality of DCT blocks contained in each divided macro block, the recording apparatus comprising: conversion means for rearranging the arrangement of DCT coefficient data which is coded independently for each DCT block into the sequence from the coefficient data of a low order to the coefficient data of a high order in such a manner as to extend across a plurality of the DCT blocks within a macro block; packing means for performing packing by assigning the coefficient data rearranged by the conversion means to a fixed-length frame for each of the macro blocks and for packing in sequence the portion which extends outside the fixed-length frame into a portion which is unfilled in the fixed-length frame; error-correction coding means for performing error-correction coding using a product code on data which is packed by the packing means and which corresponds to a plurality of the fixed-length frames; and recording means for recording data which is error-correction-coded by the error-correction coding means in a recording medium.

According to a sixth aspect of the present invention, there is provided a playback apparatus for playing back data recorded in a recording medium in such a way that each frame contained in video data is divided into a plurality of macro blocks, DCT is performed on each of a plurality of DCT blocks contained in each divided macro block in order to create DCT coefficient data, the DCT coefficient data is rearranged in the sequence from low-order DCT coefficient data to high-order DCT coefficient data in such a manner as to extend across a plurality of DCT blocks within a macro block, the rearranged DCT coefficient data is assigned to a fixed-length frame for each macro block, the portion which extends outside the fixed-length frame is packed in sequence into a portion which is unfilled in the fixed-length frame, and error-correction coding using a product code is performed on packed data corresponding to a plurality of fixed-length frames, the playback apparatus comprising: playback means for playing back data recorded in a recording medium; error-correction means for performing error correction by decoding an error-correction code using a product code of the data played back by the playback means; depacking means for reconstructing a macro block by concatenating corresponding macro blocks with respect to data on which error correction is performed by the error-correction means; and conversion means for rearranging independently for each of the DCT blocks, the arrangement of the DCT coefficients arranged in the sequence from low-order DCT coefficients to the high-order coefficients in such a manner as to extend across a plurality of DCT blocks within a macro block reconstructed by the depacking means into the sequence from the low-order coefficients to the high-order coefficients.

According to a seventh aspect of the present invention, there is provided a recording and playback apparatus which records, in a recording medium, DCT coefficient data which is created in such a way that each frame contained in video data is divided into a plurality of macro blocks and DCT is performed at intervals of a plurality of DCT blocks contained in each divided macro block in order to create DCT coefficient data, and which plays back DCT coefficients from the recording medium, the recording and playback apparatus comprising: first conversion means for rearranging the arrangement of DCT coefficient data which is coded independently for each DCT block into the sequence from the coefficient data of a low order to the coefficient data of a high order in such a manner as to extend across a plurality of the DCT blocks within a macro block; packing means for performing packing by assigning the coefficient data rearranged by the conversion means to a fixed-length frame for each of the macro blocks and for packing in sequence the portion which extends outside the fixed-length frame into a portion which is unfilled in the fixed-length frame; error-correction coding means for performing error-correction coding using a product code on data which is packed by the packing means and which corresponds to a plurality of the fixed-length frames; recording means for recording data which is error-correction-coded by the error-correction coding means in a recording medium; playback means for playing back data recorded in the recording medium; error-correction means for performing error correction by decoding an error-correction code using a product code of the data played back by the playback means; depacking means for reconstructing a macro block by concatenating corresponding macro blocks with respect to data on which error correction is performed by the error-correction means; and second conversion means for rearranging independently for each of the DCT block, the arrangement of the DCT coefficients arranged in the sequence from low-order DCT coefficients to the coefficients of a high order in such a manner as to extend across a plurality of DCT blocks within a macro block reconstructed by the depacking means into the sequence from the low-order coefficients to the high-order coefficients.

In a manner as described above, the signal processing apparatus and method, the recording apparatus, and the recording and playback apparatus in accordance with the present invention rearrange the arrangement of DCT coefficients which are coded independently for each DCT block into the sequence from low-order coefficients to high-order coefficients in such a manner as to extend across a plurality of DCT blocks. This makes it possible to use data starting from a low order for each of a plurality of DCT blocks even if all data of the plurality of DCT blocks within a macro block cannot be played back during playback.

In addition, in a manner as described above, the signal processing apparatus and method, the playback apparatus, and the recording and playback apparatus in accordance with the present invention rearrange independently for each DCT block, the arrangement of DCT coefficients arranged in the sequence from low-order DCT coefficients to high-order coefficients into the sequence from low-order coefficients to high-order coefficients in such a manner as to extend across a plurality of DCT blocks within a macro block. This makes it possible to use data starting from a low order for each of a plurality of DCT blocks even if all data of the plurality of DCT blocks within a macro block cannot be played back during playback.

The above and further objects, aspects and novel features of the invention will become more apparent from the following detailed description when read in connection with the accompanying drawings.

BRIEF DESCRIPTION OF THE DRAWINGS

FIG. 2 is a schematic diagram showing an example of a track format.

FIGS. 5A, 5B, and 5C show an example of bit assignment of an ID and a DID.

DESCRIPTION OF THE PREFERRED EMBODIMENT

Figure 1:
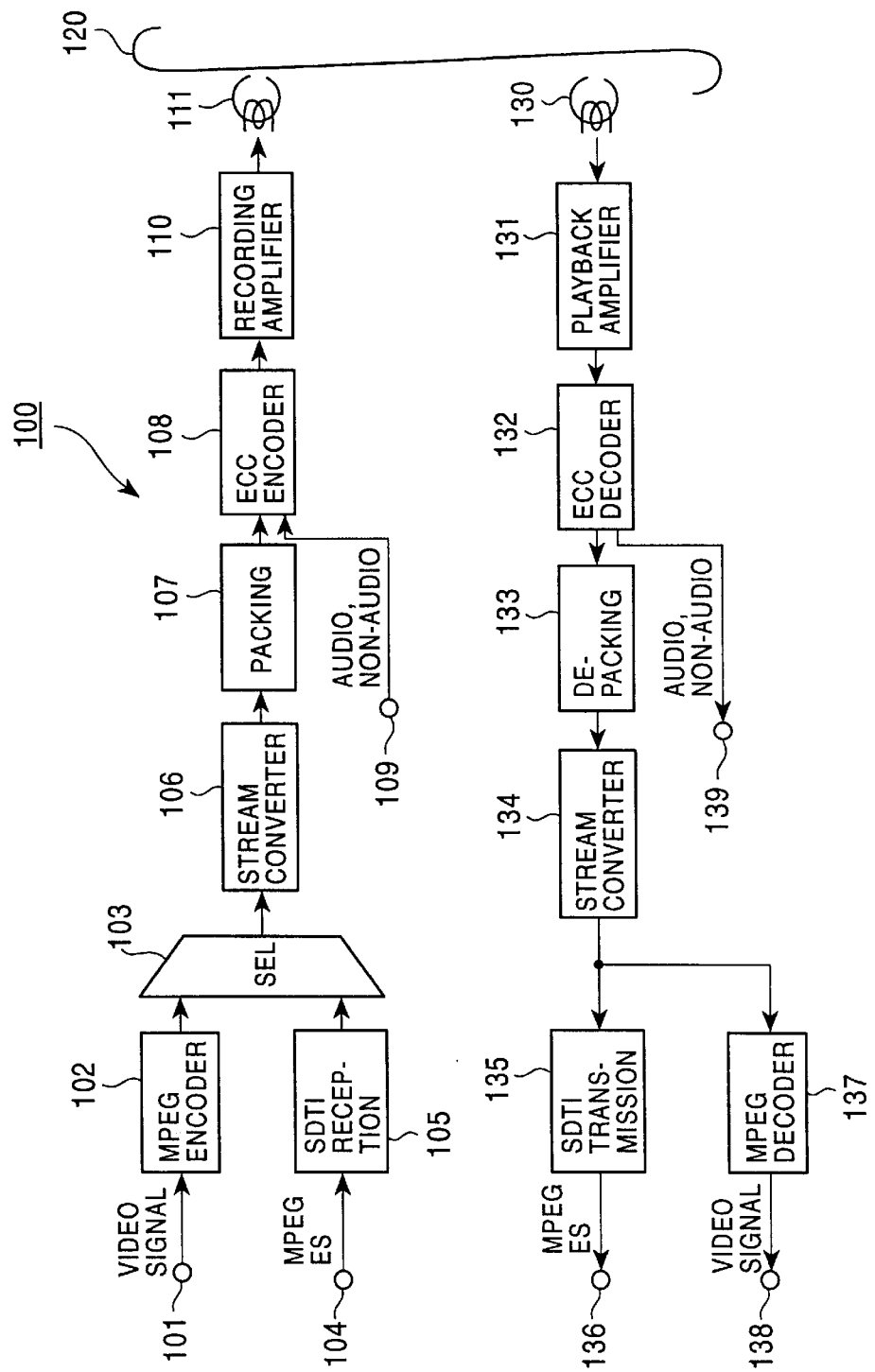
FIG. 1 is a block diagram showing an example of the construction of a recording and playback apparatus according to an embodiment of the present invention.

An embodiment of the present invention will be described below. In a recording apparatus according to this embodiment, digital audio signals are compressed and coded by an MPEG2 method and recorded on a magnetic tape by a helical scan method. At this time, DCT coefficients arranged in the sequence of frequency components for each DCT block in conformance with the specification of the MPEG method are rearranged in the sequence of frequency components through a plurality of DCT blocks which constitute one macro block. Also, during playback, the DCT coefficients arranged in this manner are rearranged into the sequence in conformance with the specification of the MPEG method and are output.

As a result of the above, for example, even if high-speed playback is performed and only a part of the data of one macro block can be played back, it is possible to cause the DCT coefficients to be spread all over in the sequence from DC components and low-frequency components to all the DCT blocks which constitute one macro block. Therefore, data which can be played back can be utilized effectively, and a higher-quality playback image can be obtained.

First, for ease of understanding, the technology is described on which an embodiment of the present invention is based. In a recording and playback apparatus according to this embodiment, video signals of a plurality of mutually different formats are handled in a unified manner. For example, in addition to handling video signals by a system of 525 lines/60 Hz in conformance with the NTSC method and by a system of 625 lines/50 Hz in conformance with the PAL method in a unified manner, signals recognized as a digital television broadcasting method, for example, a system in which the number of lines in interlaced scanning is 1080 (hereinafter referred to as a "1080i method"), or systems in which the number of lines in progressive scanning (non-interlace) are 480, 720, and 1080 (hereinafter referred to as "480p, 720p, and 1080p methods", respectively), are handled in a unified manner. That is, video signals of different formats can be recorded and played back using essentially the same hardware.

Furthermore, in this embodiment, video signals and audio signals are compressed and coded in conformance with the MPEG2 (Moving Picture Experts Group Phase 2) method. As is well known, in MPEG2, motion compensation predicative coding and coding by DCT (Discrete Cosine Transform) are combined. The data structure of MPEG2 has a hierarchical structure in which, in order beginning from the lowest, a block layer, a macro block layer, a slice layer, a picture layer, a GOP layer, and a sequence layer are formed.

The block layer is composed of DCT blocks which are units at which DCT is performed. The macro block is composed of a plurality of DCT blocks. The slice layer is composed of a header part and an arbitrary number of macro blocks which do not extend across a line. The picture layer is composed of a header part and a plurality of slices. The picture corresponds to one screen. The GOP (Group of Pictures) layer is composed of a header part, an I picture which is a picture based on intra-frame coding, and P and B pictures which are pictures based on predicative coding. At least one I picture is contained in the GOP, and P and B pictures need not to be present. The sequence layer of the uppermost layer is composed of a header part and a plurality of GOPs.

In the format of MPEG, a slice is one variable-length-coding sequence. In the variable-length-coding sequence, the boundary of data cannot be detected unless the variable-length code is decoded.

Also, an identification code (referred to as a "start code") arranged in byte units is placed at the start of each of the sequence layer, the GOP layer, the picture layer, the slice layer, and the macro block layer. The header part of each layer described above is one in which a header, and extended data or user data are collectively written. The header parts are each variable-length-coding sequences.

The size (the number of pixels in a matrix) of an image (picture) is written in the header of the sequence layer. A time code and the number of pictures which constitute a GOP are written in the header of the GOP layer.

The macro block contained in the slice layer is a set of a plurality of DCT blocks, and the coding sequence of the DCT blocks is such that the sequence of quantized DCT coefficients is formed into variable-length codes by assuming the number of consecutive times (run) of 0 coefficients and the immediately subsequent non-0 sequence (level) (the details will be described later) to be one unit. An identification code arranged in byte units is not added to the macro block and the DCT blocks within the macro block. That is, these are not one variable-length-coding sequence.

Although the details will be described later, the macro block is one in which a screen (picture) is divided into a lattice of 16 pixels×16 lines. The slice is formed, for example, by concatenating these macro blocks in the horizontal direction. The last macro block of a slice before continuous slices is continuous with the start macro block of the next slice, and formation of overlapping of macro blocks between slices is not allowed.

In the MPEG2 method, unless data is arranged in order at least in units of macro blocks, decoding cannot be performed as image data. Also, when the size of the screen is determined, the number of macro blocks per screen is determined uniquely.

In order to avoid deterioration of image quality due to a repetition of an MPEG decoding process and an MPEG encoding process, it is preferable that the encoded stream be edited in the state of the encoded stream without performing an MPEG decoding process thereon. At this time, for the P picture and the B picture by predicative coding, in order to decode them, previous pictures or prior and subsequent pictures in relation to time are required. For this reason, the editing unit cannot be made to be one frame unit. By taking this point into consideration, in this embodiment, one GOP is made to be composed of one I picture.

Also, a recording area where recording data, for example, for one frame is recorded is a predetermined one. In MPEG2, since variable-length coding is used, the amount of created data for one frame is made to be of an equal length so that data created in a period of one frame can be recorded in a predetermined recording area.

In addition, in this embodiment, in order to be suitable for recording on a magnetic tape, one slice is composed of one macro block, and one macro block is assigned to a fixed frame of a predetermined length.

FIG. 1 shows an example of the construction of a recording and playback apparatus 100 according to this embodiment. First, this construction is described briefly. During recording, a digital video signal of a predetermined method is input from a terminal 101. This video signal is formed into a variable-length code by an MPEG encoder 102 and output as variable-length-coded (VLC) data. This data is an elementary stream which complies with MPEG2 (Moving Picture Experts Group Phase 2). This output is supplied to one of the input terminals of a selector 103.

In contrast, data of a format of SDTI (Serial Data Transport Interface), which is an interface defined by ANSI/SMPTE 305M, is input to a terminal 104 so as to cover various formats. A signal containing an elementary stream of MPEG2 is input from the terminal 104. This signal is synchronously detected by an SDTI receiving circuit 105. Then, the signal is temporarily stored in the buffer, and the elementary stream is extracted. The extracted elementary stream is supplied to the other input terminal of the selector 103.

The elementary stream which is selected and output by the selector 103 is supplied to a stream converter 106. As will be described later, in the stream converter 106, the DCT coefficients arranged for each DCT block in conformance with the specification of MPEG2 are rearranged for each frequency component through a plurality of DCT blocks which constitute one macro block. The rearranged, converted elementary stream is supplied to a packing circuit 107.

Since the video data of the elementary stream is formed into variable-length codes, the lengths of the data of each macro block are not regular. In the packing circuit 107, the macro block is made to flow into a fixed frame. At this time, the portions which extend outside the fixed frame are packed in sequence into the portions which are unfilled with respect to the size of the fixed frame. The data which is packed in this manner is supplied to an ECC (Error-correction coding) encoder 108.

A packed video signal is supplied to the ECC encoder 108, and a digital audio signal is supplied thereto, for example, from a terminal 109. In this embodiment, a non-compressed digital audio signal is handled. These signals are shuffled for each sync block by the ECC encoder 108. As a result of shuffling being performed, data is arranged uniformly with respect to the pattern on the tape. Together therewith, for example, an intra-code parity and an extra-code parity are added, and error-correction coding using a product code is performed. Then, a SYNC pattern for detecting synchronization, an ID for identifying a sync block, and a DID for indicating information about the contents of data to be recorded are added to the error-correction-coded data. The SYNC pattern, the ID, and the DID will be described later.

The output of the ECC encoder 108 is, for example, channel-coded by a recording coding circuit (not shown), is converted into a form suitable for recording, is amplified by a recording amplifier 110, and is supplied to a recording head 111. Recording is performed onto a magnetic tape 120 by the recording head 111 by a helical scan method. The details of the recording method and the format will be described later.

During playback, the signal recorded on the magnetic tape 120 is played back by a playback head 130 and is supplied to a playback amplifier 131. The playback signal is subjected to equalization and waveform shaping by the playback amplifier 131 and is converted into a digital signal by a decoding circuit (not shown). The playback digital signal output from the playback amplifier 131 is supplied to an ECC decoder 132.

In the ECC decoder 132, first, synchronous detection is performed based on a SYNC pattern which is added during recording, and a sync block is extracted. Then, error correction is performed in accordance with an error-correction code added during recording. When errors are present in such a manner as to exceed the error-correction performance possessed by the error-correction code, an error flag indicating this fact is set. Then, shuffling is performed so that the data shuffled during recording is rearranged in the original sequence.

The video data output from the ECC decoder 132 is supplied to a depacking circuit 133. The depacking circuit 133 releases the packing performed during recording. That is, the length of the data is returned in units of macro blocks in order to reconstruct the original variable-length code. Here, if an error flag has been set by the above-mentioned ECC decoder 132, data whose error is not corrected is corrected by a conceal circuit (not shown). The data correction is performed, for example, by filling all the data with [0] or by replacing the data with the data of the previous frame. In the ECC decoder 132, error correction of the audio data is also performed. The audio data is output to, for example, a terminal 139.

The output of the depacking circuit 133 is supplied to a stream converter 134. In the stream converter 134, a process which is the reverse of that of the above-mentioned stream converter 106 is performed. That is, the DCT coefficients arranged for each frequency through the DCT blocks are rearranged for each DCT block. As a result, the playback signal is converted into an elementary stream which complies with the MPEG2.

This elementary stream is supplied to an SDTI transmission circuit 135 whereby it is converted into an SDTI format and is output to a terminal 136. Also, this elementary stream is supplied to an MPEG decoder 137 whereby decoding in conformance with the specification of MPEG2 is performed in order to decode it into a digital video signal, and this is output to a terminal 138.

In this embodiment, recording of signals on a magnetic tape is performed by a helical scan method in which oblique tracks are formed by a magnetic head provided on a rotating rotary head. A plurality of magnetic heads are provided at each of mutually opposing positions on the rotary drum. That is, when a magnetic tape is wound at a winding angle of about 180° around the rotary head, the rotation of 180° of the rotary head makes it possible to simultaneously form a plurality of tracks. Also, two magnetic heads, whose azimuths are different from each other, are deemed to be one set. The plurality of magnetic heads are positioned in such a way that the azimuths of adjacent tracks are different from each other.

FIG. 2 shows an example of a track format formed on a magnetic tape by the above-mentioned rotary head. This is an example in which recording is performed at 8 tracks per frame. In the format of this example, video signals of interlaced scanning (480i) are recorded in which, for example, the frame frequency is 29.97 Hz, the rate is 50 Mbps, the number of effective lines is 480, and the number of effective horizontal pixels is 720. Also, video signals of interlaced scanning (576i) are recorded in which, for example, the frame frequency is 25 Hz, the rate is 50 Mbps, the number of effective lines is 576, and the number of effective horizontal pixels is 720. In this example, in order that the data can be played back more reliably, data of one frame is recorded doubly, the whole being formed of 16 tracks.

By assuming two tracks whose azimuths are different from each other to be one set, a segment is formed. That is, eight tracks are formed of four segments. A track number [0] is assigned to one of the tracks which constitute the segment, and a track number [1] is assigned to the other track. As described above, in the example shown in FIG. 2, data of one frame is recorded doubly. At this time, the track number is replaced, and a track sequence which is different for each frame is assigned. As a result, even if one of a set of magnetic heads whose azimuths are different cannot read due to, for example, clogging, it is still possible to play back data.

In each track, a video sector in which video data is recorded on both ends is placed, and an audio sector in which audio data is recorded is placed in such a manner as to be sandwiched between video sectors. FIG. 2 and FIGS. 3A, 3B, and 3C to be described later show the arrangement of sectors on a tape.

In this example, audio data of eight channels can be handled. A1 to A8 indicate 1ch to 8ch of audio data, respectively. The audio data is recorded with its arrangement being varied in units of segments. Also, in this example, the video data is recorded in such a way that data for four error-correction blocks is interleaved with respect to one track and that the video data is divided into the sectors of the upper side and the lower side. In the video sector of the lower side, a system area is provided at a predetermined position. The error-correction block will be described later.

One track is composed of a plurality of blocks, which are referred to as "sync blocks" and which are evenly divided. FIG. 2 schematically shows the structure of a sync block. Although the details will be described later, the sync block is composed of a SYNC pattern for detecting synchronization, an ID for identifying each sync block, a DID for indicating the contents of data which follow, data packets, and an intra-code parity for correcting an error. The data is handled as packets in units of sync blocks. That is, the smallest data unit to be recorded or played back is one sync block. A number of sync blocks are arranged, forming, for example, a video sector.

In FIG. 2, SAT1(Tr) and SAT2(Tm) are areas where signals for servo lock are recorded. Also, between recording areas, gaps (Vg1, Sg1, Ag, Sg2, Sg3, and Vg2) of a predetermined size are provided.

Figure 3A:
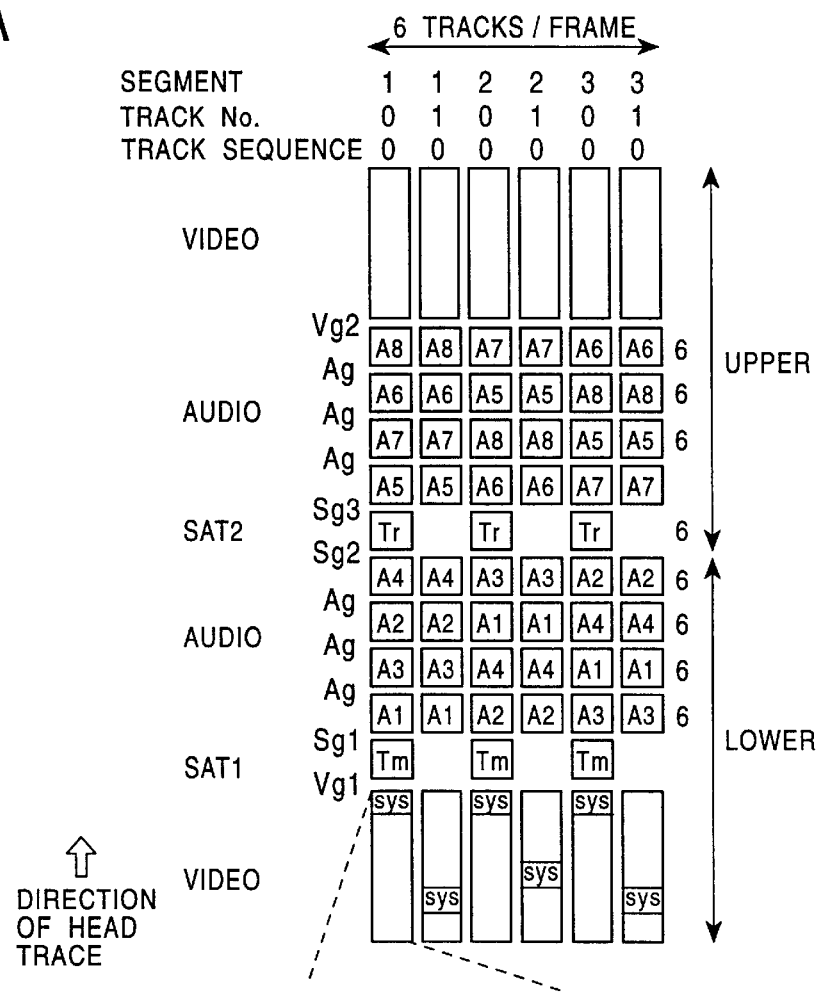
FIGS. 3A, 3B, and 3C are schematic diagrams showing another example of a track format.
Figure 3B:
Figure 3C:
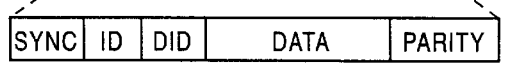

Here, an example is described in which recording is performed at eight tracks per frame, but this embodiment is not limited to this example. In this embodiment, furthermore, recording can be performed at four tracks, six tracks, and others per frame. FIGS. 3A, 3B, and 3C show an example in which one frame is recorded at six tracks. In this example, double recording of one frame is not performed, and the track sequence is only [0]. It is possible for the recording and playback apparatus according to this embodiment to handle both the track format of this other example and the above-described track format shown in FIG. 2.

Figure 4A:
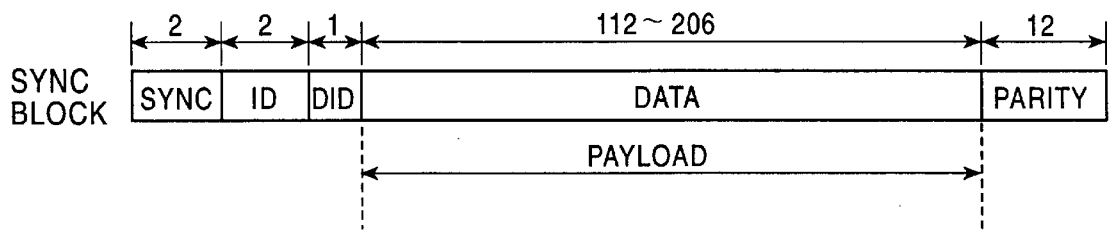
FIGS. 4A, 4B, 4C, 4D, and 4E are schematic diagrams showing an example of a sync block.

FIGS. 4A, 4B, 4C, 4D, and 4E show an example of a sync block, which is a recording unit at each track. In this embodiment, one or two macro blocks are stored in one sync block, and the size of one sync block is variable in length according to the format of a video signal to be handled. As shown in FIG. 4A, one sync block is composed of, from the start, a 2-byte SYNC pattern, a 2-byte ID, a 1-byte DID, a data area defined to be variable, for example, between 112 bytes to 206 bytes, and a 12-byte parity (intra-code parity). The data area is also referred to as a "payload".

The initial 2-byte SYNC pattern, which is for synchronization detection, is formed of a predetermined pattern. By detecting a SYNC pattern which matches a unique pattern, synchronization detection is performed.

The ID is composed of two parts of ID0 and ID1, information for identifying individual sync blocks being stored therein. FIG. 5A shows an example of bit assignment of ID0 and ID1. Identification information (SYNC ID) for identifying each sync block within one track is stored in the ID0. SYNC ID is, for example, a serial number. SYNC ID is represented by seven bits. In this embodiment, since, for example, 216 sync blocks are placed per track, a 7-bit SYNC ID can represent one half of a track.

Information about the track of the sync block is stored in the ID1. When the MSB part is represented by bit 7 and the LSB part is represented by bit 0, with regard to this sync block, bit 7 indicates whether it is the upper or lower side of the track, and bits 5 to 2 indicate the segment of the track. Also, bit 1 indicates the track number corresponding to the azimuth of the track, and bit 0 indicates which of the video data and the audio data this sync block is for.

Information about a payload is stored in the DID. Based on the value of bit 0 of the above-mentioned ID1, depending upon whether the data is video or audio, the contents of the DID differ. FIG. 5B shows an example of bit assignment of the DID in the case of video. Bits 7 to 4 are not defined (reserved). Bits 3 and 2 indicate the mode of the payload, for example, the type of the payload. Bits 3 and 2 are auxiliary ones. Bit 1 indicates that one or two macro blocks are stored in the payload. Bit 0 indicates whether or not the video data stored in the payload is an extra-code parity.

FIG. 5C shows an example of the bit assignment of DID in the case of audio. Bits 7 to 4 are reserved. Bit 3 indicates whether the data stored in the payload is audio data or ordinary data. When compressed and coded audio data is stored in the payload, bit 3 is set at a value which indicates data. Information of a five-field sequence in the NTSC method is stored in the bits 2 to 0. That is, in the NTSC method, the audio signal with respect to one field of a video signal is one of 800 samples and 801 samples when the sampling frequency is 48 kHz, and this sequence is arranged in order at intervals of five fields. Bits 2 to 0 indicate the position in the sequence the information is in.

Figure 4B:
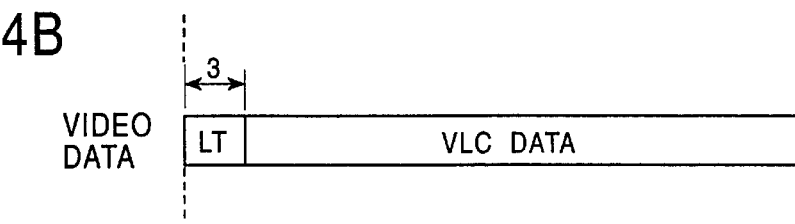
Figure 4C:
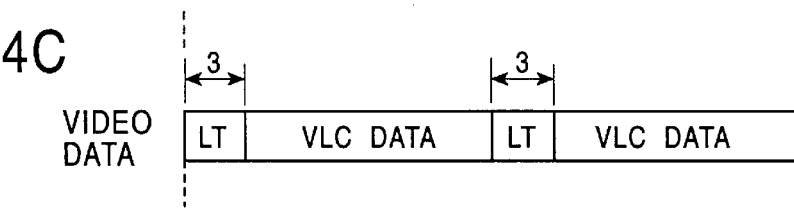

Referring back to FIGS. 4A to 4E, FIGS. 4B to 4E show an example of the above-mentioned payload. FIGS. 4B and 4C show examples of cases in which video data (variable-length-coded data) of one and two macro blocks are stored in the payload, respectively. In the example in which one macro block is stored, length information LT indicating the length of the macro block which follows is placed in the initial three bytes. The length information LT does not contain its own length. Also, in the example shown in FIG. 4C, two macro blocks are stored, the length information LT of the first macro block is placed at the start, and the first macro block is placed successively. Then, following the first macro block, length information LT indicating the length of the second macro block is placed, and following it, the second macro block is placed.

Figure 4D:
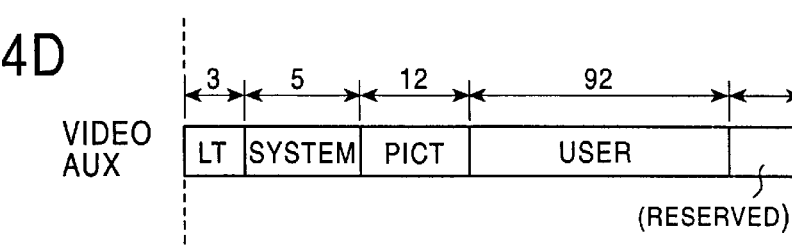

FIG. 4D shows an example of a case in which video AUX data is stored in the payload. In the initial length information LT, the length of the video AUX data, which does not contain itself, is written. Following this length information LT, 5-byte system information, 12-byte PICT information, and 92-byte user information are stored. The portion which is unfilled with respect to the length of the payload is reserved.

Figure 4E:
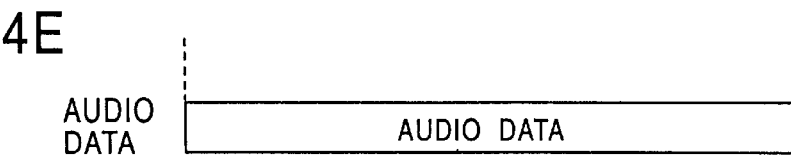

FIG. 4E shows an example of a case in which audio data is stored in the payload. The audio data can be packed over the total length of the payload. The audio signal is handled in a form in which compression processing is not performed, for example, in a PCM (Pulse Code Modulation) form. In addition to this, audio data which is compressed and coded by a predetermined method can also be handled.

In this embodiment, in a manner as described above, since the sync block length is variable, the length of a sync block in which video data is recorded and the length of a sync block in which audio data is recorded can be set each to a length which is most appropriate according to the signal format. As a result, it is possible to handle a plurality of different signal formats in a unified manner.

Next, each section of this recording and playback apparatus 100 will be described in more detail. Processing during recording is described first. A digital video signal in which the ratio of the luminance signal Y and the chromaticity signals Cr and Cb is 4:2:2, for example, in conformance with the NTSC method, is input to an input terminal 101. This signal is supplied to the MPEG encoder 102.

Figure 6:
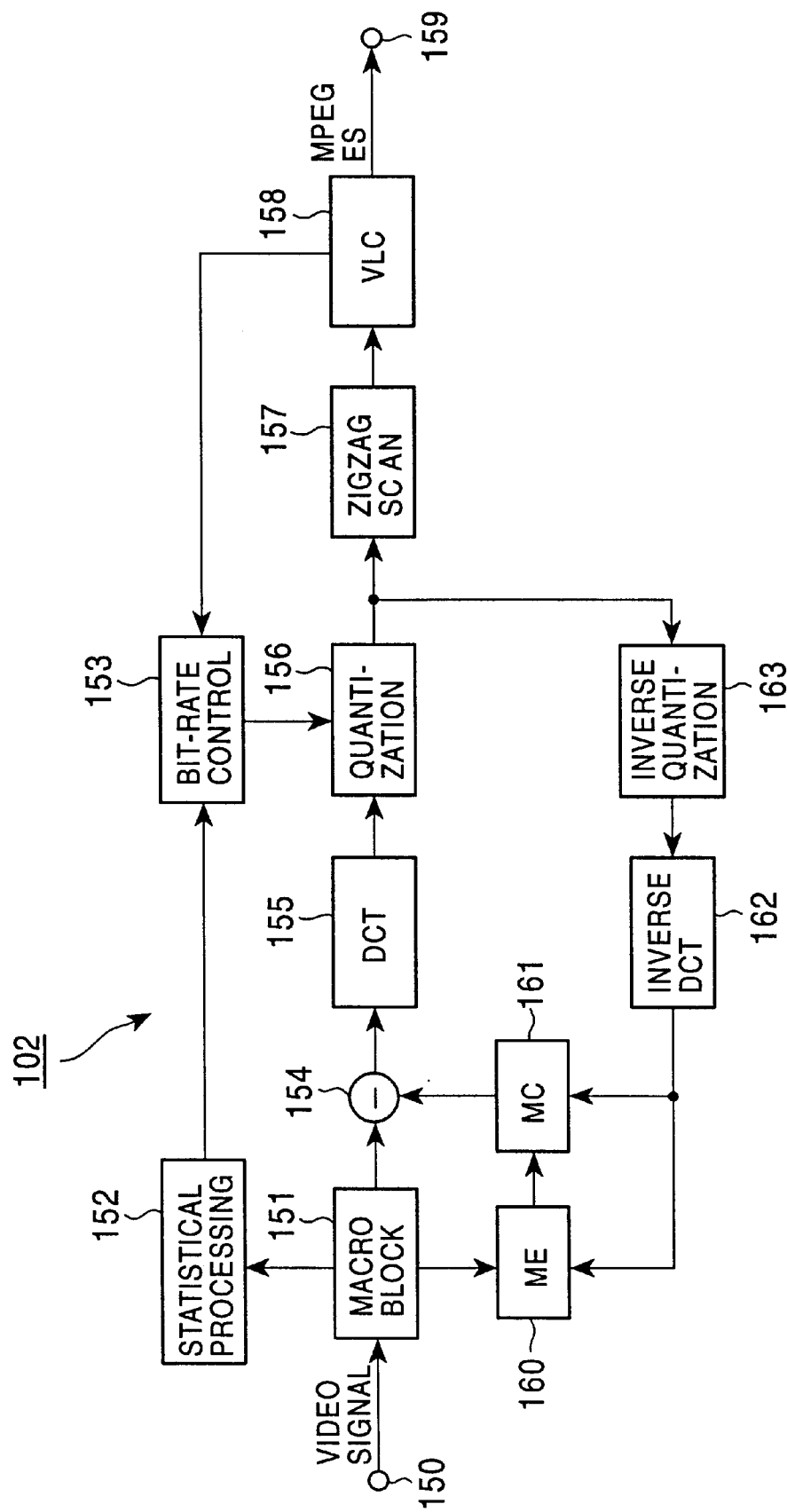
FIG. 6 is a block diagram showing an example of the construction of an MPEG encoder.

FIG. 6 shows an example of the construction of the MPEG encoder 102. A signal supplied from a terminal 150 is divided into macro blocks of, for example, 16 pixels×16 lines, by a blocking circuit 151. These macro blocks are supplied to one of the input terminals of a subtractor 154 and also to a motion detection circuit 160. Furthermore, the input image data is also supplied to a statistical processing circuit 152. In the statistical processing circuit 152, the complexity of the input image data is calculated by a predetermined statistical process. The calculation result is supplied to a bit-rate control circuit 153.

In the motion detection circuit 160, the macro block supplied from the blocking circuit 151 is compared with the macro block earlier by one frame (or one field), supplied via an inverse quantization circuit 163 and an inverse DCT circuit 162, which will be described later, and motion information (motion vector) is obtained, for example, by block matching. In a motion compensation circuit 161, motion compensation in accordance with this motion information is performed, and the motion-compensated result is supplied to the other input terminal of the subtractor 154.

The difference between the input image data and the motion-compensated result is determined by the subtractor 154 and is supplied to a DCT circuit 155. The DCT circuit 155 further divides this macro block of the difference into DCT blocks composed of 8 pixels×8 lines, and performs DCT on each DCT block. The DCT coefficient output from the DCT circuit 155 is quantized by a quantization circuit 156. During quantization, the bit rate is controlled in accordance with control information from the bit-rate control circuit 153. The quantized DCT coefficient is supplied to the inverse quantization circuit 163 and a zigzag scan circuit 157.

In the zigzag scan circuit 157, the DCT coefficients are zigzag-scanned and output, and for each DCT block, the DCT coefficients are arranged in the sequence from the DC components and the low-frequency components to the high-frequency components. This DCT coefficient is formed into a variable-length code by a VLC circuit 158 and is output, as an elementary stream which complies with the MPEG2, to an output terminal 159. The output elementary stream is variable-length-coded data in units of macro blocks.

Figure 7A:
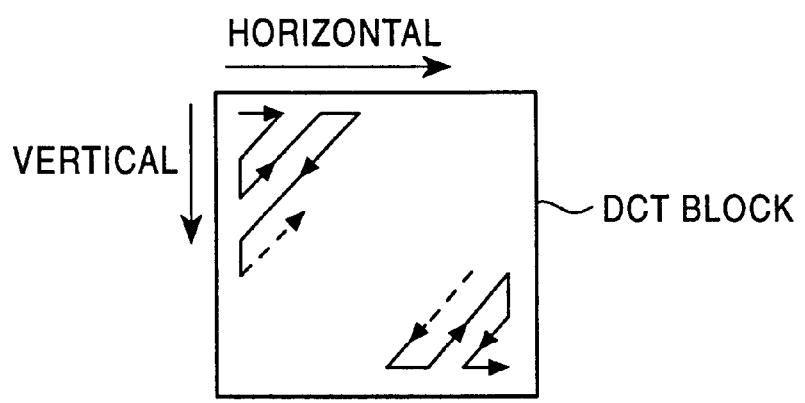
FIGS. 7A and 7B are diagrams illustrating zigzag scanning and variable-length coding.
Figure 7B:
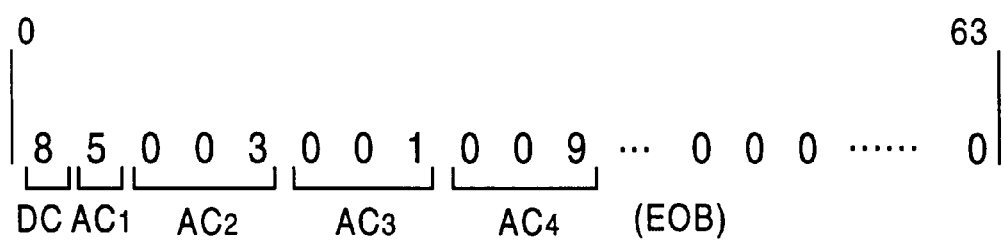

FIGS. 7A and 7B schematically show the process in the zigzag scan circuit 157 and the VLC circuit 158. As shown in FIG. 7A, assuming that, in the DCT block, for example, the upper left show DC components, the horizontal spatial frequency and the vertical spatial frequency become higher in the right direction and in the downward direction, respectively. In the zigzag scan circuit 157, each DCT coefficient of the DCT block is zigzag-scanned starting from the DC components in the upper left in a direction in which the horizontal and vertical spatial frequencies become higher.

As a result, in an example as shown in FIG. 7B, a total of 64 (8 pixels×8 lines) DCT coefficients are obtained which are arranged in the sequence of the frequency components. These DCT coefficients are supplied to the VLC circuit 158 whereby they are formed into variable-length codes. That is, for each coefficient, the first coefficient is fixed as a DC component, and from the next components (AC components), the coefficients are enclosed for a continuous run and the subsequent level, and one code is assigned thereto, thereby performing variable-length coding. The codes $AC_1, AC_2, AC_3, \ldots$ are assigned from the coefficient with low (low-order) frequency components to the coefficient with high (high-order) frequency components, and are so arranged. In this specification, a DCT coefficient having a low spatial frequency is represented as a low-order DCT coefficient, and a DCT coefficient having a high spatial frequency is represented as a high-order DCT coefficient.

The coding information during the variable-length coding in the VLC circuit 158 is supplied to the bit-rate control circuit 153. The bit-rate control circuit 153 supplies the bit-rate control information to the quantization circuit 156 so that a bit rate which is appropriate in output can be obtained on the basis of this coding information and the calculation result of the complexity of the macro block by the above-mentioned statistical processing circuit 152. In accordance with this bit-rate control information, the GOP is formed in a fixed length.

In contrast, the DCT coefficient supplied to the inverse quantization circuit 163 is inverse-quantized and is decoded into image data by the inverse DCT circuit 162, and is supplied to the motion detection circuit 160 and the motion compensation circuit 161.

In this embodiment, only the I picture is used, and the P and B pictures are not used. Therefore, in the construction of the above-described MPEG encoder 102, the construction for performing motion compensation among frames or fields, that is, the inverse quantization circuit 163, the inverse DCT circuit 162, the motion compensation circuit 161, and the motion detection circuit 160 can be omitted.

The elementary stream output from the MPEG encoder 102 and the SDTI receiving circuit 105 is selected by the selector 103 and is supplied to the stream converter 106. In the stream converter 106, the DCT coefficients of the supplied signal are rearranged. That is, within each macro block, the DCT coefficients arranged in the sequence of the frequency components for each DCT block in conformance with the specification of MPEG2 are rearranged in the sequence of the frequency components through each DCT block which is a constituent of the macro block.

Figure 8A:
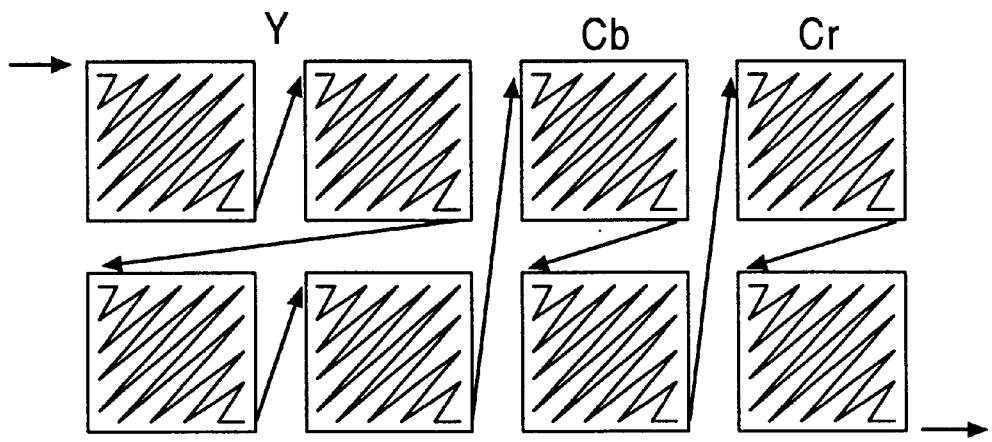
FIGS. 8A and 8B are diagrams schematically showing the rearrangement of DCT coefficients in a stream converter.
Figure 8B:
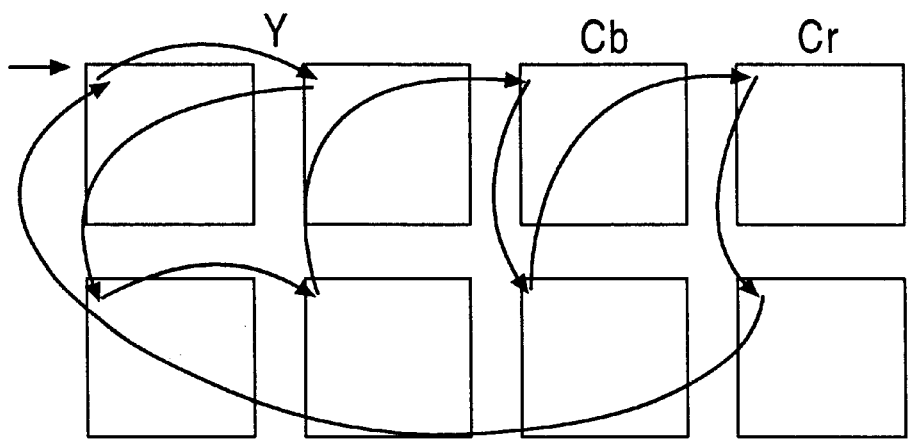

FIGS. 8A and 8B schematically show the arrangement of DCT coefficients in the stream converter 106. For example, in the case of a video signal by an NTSC method, since the ratio of the luminance signal Y and the chromaticity signals Cb and Cr is 4:2:2, one macro block is composed of four DCT blocks (DCT blocks $Y_1$, $Y_2$, $Y_3$, and $Y_4$) by the luminance signal Y and two DCT blocks (DCT blocks $Cb_1$, $Cb_2$, $Cr_1$, and $Cr_2$) by each of the color signals Cb and Cr.

As described above, in the MPEG encoder 102, a zigzag scan is performed in accordance with the specification of the MPEG2. As shown in FIG. 8A, the DCT coefficients are arranged in the sequence of the frequency components from the DC components and the low-frequency components to the high-frequency components for each DCT block. After the scanning of one DCT block is terminated, the scanning of the next DCT block is performed, and in a similar manner, the DCT coefficients are arranged.

More specifically, within the macro block, the DCT coefficients are arranged in the sequence of the frequency components from the DC components and the low-frequency components to the high-frequency components for each of the DCT blocks $Y_1$, $Y_2$, $Y_3$, and $Y_4$, and DCT blocks $Cb_1$, $Cb_2$, $Cr_1$, and $Cr_2$. Then, as described above, one code, [DC, $AC_1$, $AC_2$, and $AC_3$, . . . ], each is assigned to a set formed of a continuous run and the subsequent level, being formed into a variable-length code.

In the stream converter 106, the DCT coefficients which are variable-length-coded and arranged are rearranged in the sequence of the frequency components in such a manner as to extend across each DCT block which is a constituent of the macro block by decoding the variable-length code once and by detecting the delimitation of each coefficient. This situation is shown in FIG. 8B. The DCT coefficients are arranged in the sequence of the frequency components from the DC components and the low-frequency components to the high-frequency components, that is, from a low-order coefficient to a high-order coefficient, in such a manner as to extend across each DCT block.

More specifically, within the macro block, the DCT coefficients are arranged in the sequence of each frequency component containing DC components in such a manner as to extend across each DCT block, as $DC(Y_1)$, $DC(Y_2)$, $DC(Y_3)$, $DC(Y_4)$, $DC(Cb_1)$, $DC(Cb_2)$, $DC(Cr_1)$, $DC(Cr_2)$, $AC_1(Y_1)$, $AC_1(Y_2)$, $AC_1(Y_3)$, $AC_1(Y_4)$, $AC_1(Cb_1)$, $AC_1(Cb_2)$, $AC_1(Cr_1)$, $AC_1(Cr_2)$ . . . . In practice, one code which is assigned to a set formed of a continuous run and the subsequent level, is arranged in such a manner as to correspond to the sequence of each frequency component.

Figure 9:
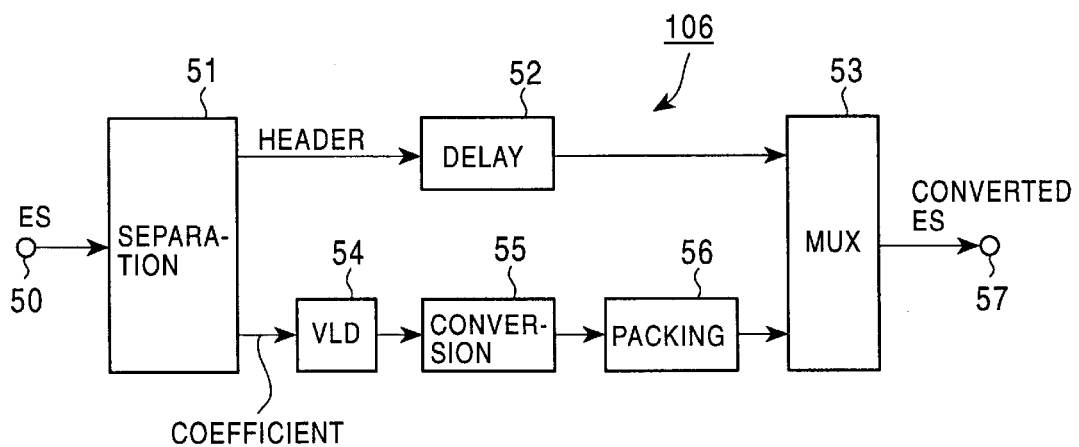
FIG. 9 is a block diagram showing an example of the construction of the stream converter.
Figure 10:
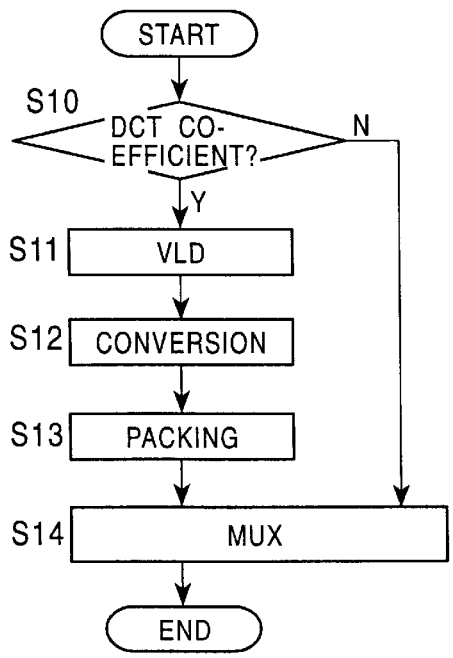
FIG. 10 is a flowchart briefly showing the flow of the process in the stream converter.

Referring to FIGS. 9, 10, and 11A to 11D, a process in the stream converter 106 is described below. FIG. 9 shows an example of the construction of the stream converter 106. FIG. 10 schematically shows the flow of the process in the construction in FIG. 9. FIGS. 11A, 11B, 11C, and 11D show the change of data within this stream converter 106.

In FIG. 9, an elementary stream is input from a terminal 50 and supplied to a separation circuit 51. The elementary stream is separated by the separation circuit 51 into the DCT coefficient part contained in the macro block layer and the header part of the macro block layer or higher, that is, a sequence header, a GOP header, a picture header, etc. (FIG. 10, step S10). The header part of the macro block layer or higher is supplied to a multiplexer 53 via a delay circuit 52.

The DCT coefficient part separated by the separation circuit 51 is supplied to a VLD (Variable Length Decoder) circuit 54. Then, the variable-length code is decoded, the delimitation of the DCT coefficients is detected, and the portion corresponding to each DCT coefficient is extracted (FIG. 10, step S11). Each DCT coefficient part is supplied to a conversion circuit 55.

Figure 11A:
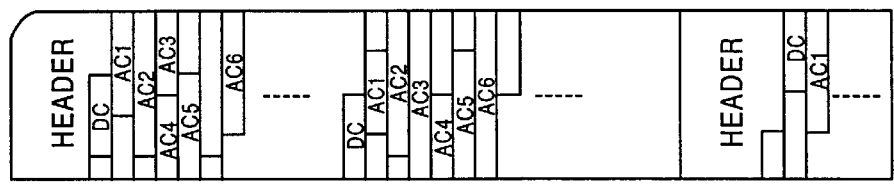
FIGS. 11A, 11B, 11C, and 11D are schematic diagrams showing the change of data within the stream converter.
Figure 11B:
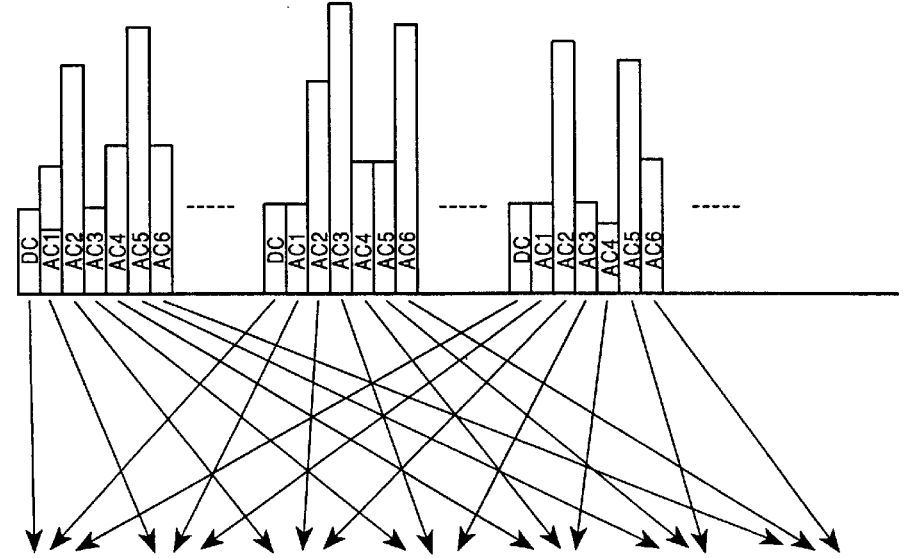

In the conversion circuit 55, the rearrangement of the DCT coefficients is performed. In an example as shown in FIG. 11B, with the header part being separated from the elementary stream (FIG. 11A), the DCT coefficients supplied to the conversion circuit 55 are arranged as DC, $AC_1$, $AC_2$, . . . , from the low-order coefficients to the high-order coefficients. This arrangement is repeated in a similar manner for each DCT block. This is arranged by the conversion circuit 55 from the low-order coefficient to the high-order coefficient in such a manner as to extend across each DCT block within the macro block (FIG. 10, step S12).

Figure 11C:
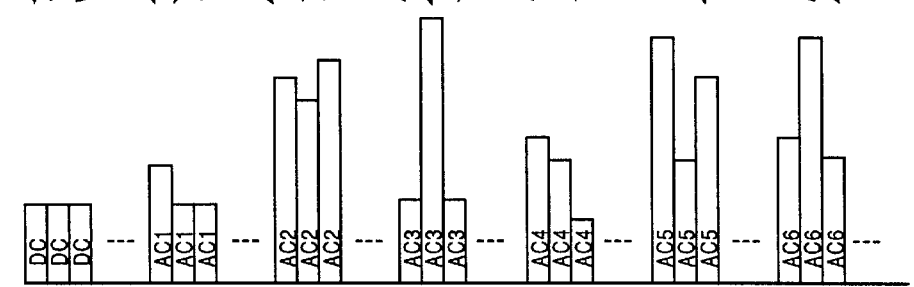

More specifically, in an example as shown in FIG. 11C, first, the DCT components in each DCT block are extracted and are arranged in the sequence of the DCT block. Next, the initial low-frequency components $AC_1$ of each DCT block are extracted and are arranged in the sequence of the DCT blocks. In this manner, in the conversion circuit 55, the DCT coefficient corresponding to the frequency component is extracted in sequence from the DC components and the low-frequency components from each DCT block. As described above, this DCT coefficient is composed of one code which is assigned to a set formed of a continuous run and the subsequent level. Then, for these codes, the codes of the corresponding order are rearranged in the sequence of the DCT blocks.

More specifically, before conversion, the DCT coefficients are formed in such a manner as to be arranged as DC, $AC_1$, $AC_2$, . . . , $AC_{63}$ for each DCT block (FIG. 11B). However, if these are recorded on a magnetic tape in this sequence, in a case in which, for example, high-speed playback is performed and data of only the middle of the block can be obtained, the DCT blocks of the second half cannot be played back at all. Therefore, as in the present invention, the sequence of the DCT coefficients is rearranged from the low-order coefficient to the high-order coefficient in such a manner as to extend across each DCT block, as DC, DC, . . . , $AC_1$, $AC_1$, . . . , $AC_1$, $AC_2$, $AC_2$, . . . , $AC_{63}$, $AC_{63}$, . . . $AC_{63}$ (FIG. 11C). For the stream rearranged in this manner, even if, for example, data of only the middle of the block can be obtained, in each DCT block, the low-order coefficients of the DCT coefficients, that is, the DC components and the low-frequency components, can be obtained. Therefore, it is possible to obtain an image having the highest possible quality from the data in which a part of the stream has been lost.

The DCT coefficients rearranged in this manner are supplied to a packing circuit 56 whereby the individual DCT coefficients are packed into one. The packing process in this packing circuit 56 is different from the packing process in a packing circuit 107 which follows.

Figure 11D:
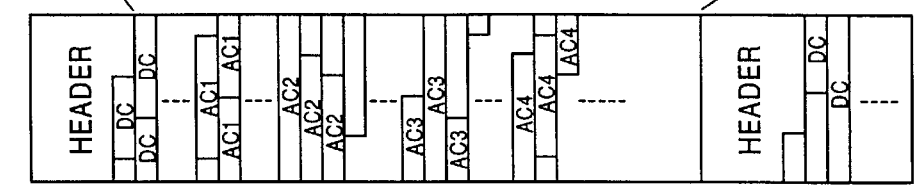

The output from the packing circuit 56 is supplied to the multiplexer 53. Then, the packed DCT coefficients and the header part of the macro block or higher which is supplied with a predetermined amount of delay being provided to provide timing by the delay circuit 52, are multiplexed (FIG. 11D). The converted elementary stream in which the rearranged DCT coefficients and the header part are multiplexed is output to a terminal 57.

In order to perform this stream conversion in the shortest time, it is necessary to sufficiently secure the transfer speed of the bus which exchanges signals with portions prior to and subsequent thereto by causing the arrangement of the DCT coefficients to operate in accordance with the clock rate of the pixel data. For example, it is assumed that the pixel rate is 27 MHz/bps (bits per second) and one pixel is eight bits long. Since the variable-length coding result is that one pixel becomes 24 bits which is at most triple, 27 MHz×24 bits are required for the band width. Here, by performing input and output at 81 MHz×8 bits or 54 MHz×16 bits, the bit width can be reduced, making it unnecessary to limit the maximum length of the macro block.

Also, when the maximum length of the macro block is limited, the band width is secured at which the data for an amount corresponding thereto can be transferred within a transfer time for one macro block. For example, if the maximum length of the macro block is limited to 512 bytes, interfacing is performed at a band width of 27 MHz×8 bits.

Furthermore, in this stream converter 106, in a case in which an elementary stream, such as one which is not one macro block/one slice, is supplied from outside, it is possible for the stream converter 106 to have a function for converting this elementary stream into one macro block/one slice (not shown). For example, when the elementary stream supplied from a terminal 104 is one stripe/one slice, this stream converter 106 converts it into one macro block/one slice.

Furthermore, it is possible for this stream converter 106 to have a function for preventing an overflow in a case in which the elementary stream supplied from outside exceeds the recording bit rate of the apparatus, that is, the above-described fixed length in GOP units (not shown). For example, in the stream converter 106, the high-order coefficients (high-frequency components) of the DCT coefficients are replaced with zero, and the process is discontinued.

Here, in the stream converter 106, by decoding the variable-length codes of the DCT coefficients, the rearrangement of the DCT coefficients is performed, but this embodiment is not limited to this example. That is, the DCT coefficients in which the variable-length codes are decoded may be rearranged.

In this way, the converted elementary stream in which the elementary stream is rearranged by the stream converter 106 is supplied to the packing circuit 107.

The length of the macro block is the same in the converted elementary stream and the elementary stream before conversion. Also, in the MPEG encoder 102, even if formation into a fixed length is made in GOP units by bit-rate control, when viewed by the units of macro blocks, the length is variable. In the packing circuit 107, the macro block is assigned to a fixed frame.

Figure 12A:
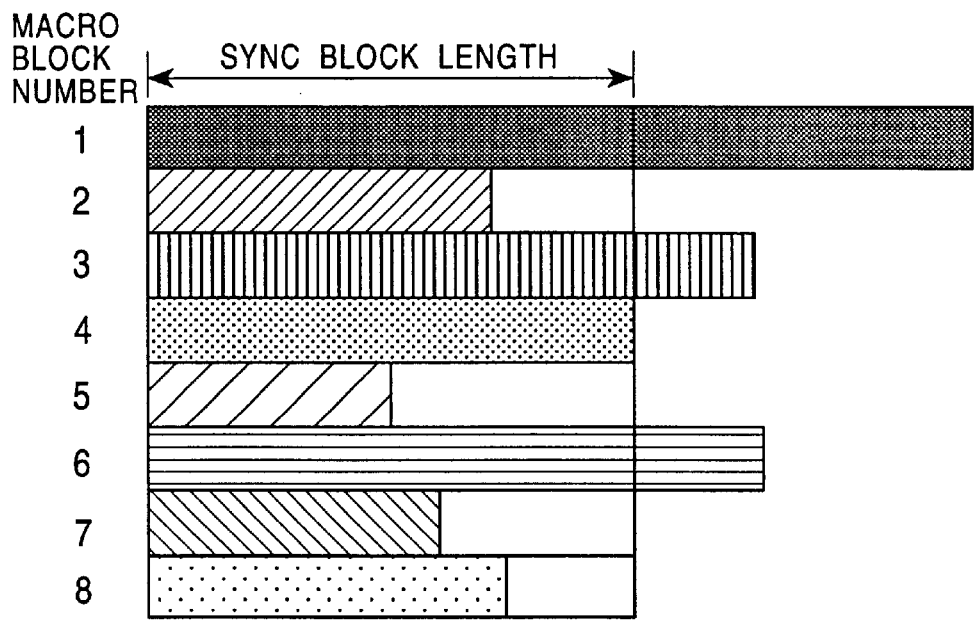
FIGS. 12A and 12B are schematic diagrams schematically showing the formation into an equal length of macro blocks.
Figure 12B:
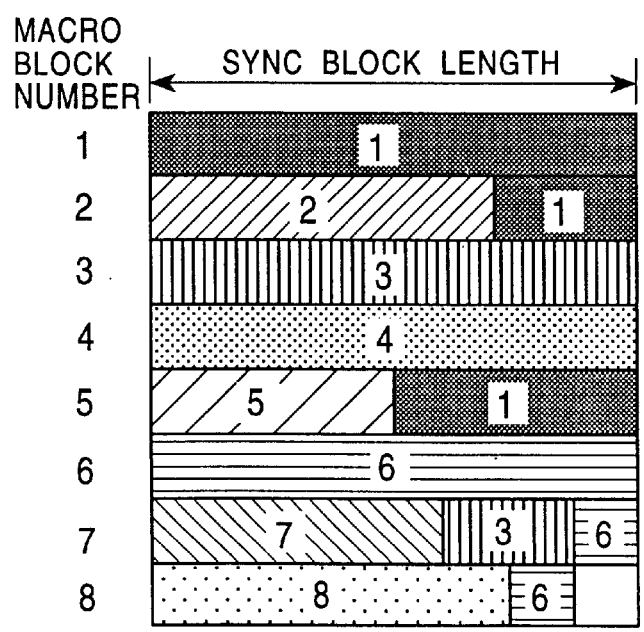

FIGS. 12A and 12B schematically show a packing process of a macro block in the packing circuit 107. The macro block is assigned to a fixed frame having a predetermined data length and is packed. When the data length of the fixed frame used at this time is made to match the sync block length which is the smallest unit of the data during recording and playback, this is convenient during shuffling and error-correction coding in the ECC encoder 108 which follows. Processing is performed, for example, at intervals of eight macro blocks, and a number, #1, #2, . . . #8, is assigned to each macro block.

As a result of the variable-length coding, in an example as shown in FIG. 12A, eight macro blocks differ in length from each other. In this example, the data of macro block #1, the data of macro block #3, and the data of macro block #6 are longer than the length of one sync block which is a fixed frame, and the data of macro block #2, the data of macro block #5, the data of macro block #7, and the data of macro block #8 are shorter. Also, the data of macro block #4 is of a length nearly equal to one sync block.

As a result of the packing process, the macro block is made to flow into the fixed frame of one sync block length, and the entire data created for a period of one frame is formed into a fixed length. In an example as shown in FIG. 7B, a macro block which is longer than one sync block is divided at a position corresponding to the sync block length. The portion which extends outside the sync block length of the divided macro block is filled into the unfilled area in sequence starting from the beginning, that is, the portion after the macro block whose length does not reach the sync block length.

In the example of FIG. 12B, the portion which extends outside the sync block length of macro block #1 is first filled into the portion after macro block #2, and when the macro block #2 reaches the length of the sync block, the extending-off portion is filled into the portion after macro block #5. Next, the portion which extends outside the sync block length of macro block #3 is filled into the portion after macro block #7. Furthermore, the portion which extends outside the sync block length of macro block #6 is filled into the portion after macro block #7, and the portion which further extends outside is filled into the portion after macro block #8. In this manner, each macro block is filled with respect to the fixed frame of the sync block length.

The length of each macro block can be checked in advance in the stream converter 106. As a result, in this packing circuit 107, the end of the macro block can be determined without decoding the VLC data in order to check the contents.

Also, when the packed data is recorded on a magnetic tape, the length information LT indicating the length of the macro block is provided at the beginning portion of the macro block of the fixed frame. During playback, the data packed in accordance with this length information LT is concatenated to reconstruct the macro block data. This is referred to as "depacking".

The output of the packing circuit 107 is supplied to the ECC encoder 108. In the ECC encoder 108, when data for one GOP is collected, each block corresponding to the fixed frame length is shuffled and rearranged in accordance with a predetermined rule. Then, for each of the rearranged blocks, the position on the screen is associated with the recording position on the tape. As a result of performing shuffling, tolerance of burst errors, such as those which occur at a continuous position on a tape, can be increased. Shuffling may be performed in such a way that the above-described packing circuit 107 has this function.

When shuffling is performed, an extra-code parity and an intra-code parity are added in predetermined data units (symbol), and error-correction coding using a product code is performed. First, an extra-code parity is added through a predetermined number of blocks. Next, an intra-code parity is added in the direction of the blocks with respect to each block containing an extra-code parity. The intra-code parity is added with the intra-code block composed of a data sequence which is the same as the fixed frame used during packing as a unit. Then, a DID, an ID, and a SYNC pattern are added to the beginning of each intra-code block, forming a sync block.

The data block completed by the intra-code parity and the extra-code parity is referred to as an "error-correction block".

The error-correction-coded data is scrambled by a scrambling circuit (not shown), and the frequency components are averaged. Then, the data is supplied to the recording amplifier 110 whereby it is recorded and coded, and are converted into a form suitable for recording onto the magnetic tape 120. In this embodiment, during recording and coding, a precoder of a partial response is used. The recorded and coded data is recorded onto the magnetic tape 120 by the recording head 111.

Next, a description is given of a process during playback. The signal recorded on the magnetic tape 120 is played back by the playback head 130. The played-back signal is supplied to the playback amplifier 131, is reconstructed into digital data by an equalizer, and decoding of a partial response is performed. At this time, by using a viterbi decoding method, the error rate can be improved.

The playback digital data output from the playback amplifier 131 is supplied to the ECC decoder 132. In the ECC decoder 132, first, a SYNC pattern is detected, and a sync block is extracted. The intra-code block within the sync block is intra-code-corrected by an intra-code parity, and is written into a predetermined address of the memory (not shown) in accordance with the ID. When errors are present in such a manner as to exceed the error-correction performance possessed by the error-correction code, it is assumed that the error cannot be corrected and an error flag is set for the symbol. In this manner, when intra-code correction of the data for one GOP is terminated, extra-code correction is performed using the data written into the memory.

In a similar manner, when errors are present in such a manner as to exceed the error-correction performance possessed by the error-correction code, an error flag is set. The error flag by extra-code correction is supplied to a stream converter 134 to be described later.

Deshuffling is performed on the data on which error correction is performed in this manner, and the address of the data is reconstructed. That is, during recording, since shuffling is performed in accordance with predetermined rules before error-correction coding, here, a process which is the reverse thereof is performed to rearrange the data in the correct sequence. The deshuffled data is then supplied to the depacking circuit 133.

The depacking circuit 133 reconstructs the macro block packed by the above-described packing circuit 107 during recording. That is, the sync block corresponds to the macro block, and the respective data of the macro block are concatenated so as to reconstruct the original macro block in accordance with the length information LT recorded, for example, at the beginning of the payload.

When high-speed playback is performed, in which the playback speed of the magnetic tape 120 is higher than that during recording, or variable-speed playback is performed in which playback at a tape speed different from that during recording, the relationship between the trace angle of the rotary head and the helical tracks varies, making it impossible to accurately trace one track. For this reason, since all the signals of one GOP cannot be obtained, a depacking process is not performed. Therefore, playback in units of sync blocks is performed. At this time, the data filled into the portion after the macro block which is shorter than the sync block length in accordance with the length information LT is handled as, for example, zero. Further, error correction by an intra-code parity can be performed, and deshuffling is also possible in accordance with the ID.

The output of the depacking circuit 133 is output, as a converted elementary stream, to the stream converter 134. In the stream converter 134, a process which is the reverse of that of the stream converter 106 is performed. That is, in the stream converter 134, the DCT coefficients arranged in the sequence of the frequency components are rearranged into the sequence of the frequency components for each DCT block. As a result, the converted elementary stream is inversely converted into an elementary stream which complies with the MPEG2.

In the process of stream conversion on the playback side, before conversion, error handling must be performed in accordance with the error flag by extra-code correction obtained by the ECC decoder 132. That is, when it is determined before conversion that there is an error in the middle of the macro block data, the DCT coefficients of the frequency components after the error position cannot be reconstructed. Accordingly, for example, the data at the error position is replaced with an end of block (EOB) code, and the DCT coefficients of the frequency components thereafter are set to zero. In a similar manner, also during high-speed playback, only the DCT coefficients up to the length corresponding to the sync block length are reconstructed, and the coefficients thereafter are replaced with zero data.

Since the DCT coefficients are arranged from the DC components and the low-frequency components to the high-frequency components through the DCT blocks, even if the DCT coefficients after a particular place are ignored in this manner, it is possible to cause the DCT coefficients from the DC components and the low-frequency components to be spread all over the respective DCT blocks which constitute the macro block.

Also, for the input and output of the stream converter 134, a sufficient transfer rate (band width) is secured in advance in such a manner as to correspond to the maximum length of the macro blocks in the same way as on the recording side. When the length of the macro blocks is not limited, it is preferable that a band width three times as great as the pixel rate be secured.

The elementary stream output from the stream converter 134 is supplied to, for example, the SDTI transmission circuit 135 whereby the elementary stream is formed into a predetermined signal format with a synchronization signal, etc., being added, and is output, as an elementary stream which corresponds to SDTI and complies with the MPEG2, to an output end 136.

Furthermore, the elementary stream output from the stream converter 134 can also be supplied to the MPEG decoder 137. Although not shown in the figure, the MPEG decoder 137 has the construction of an ordinary decoder which complies with the MPEG2. The elementary stream is decoded by the MPEG decoder 137 and is output, as a digital video signal, to an output end 138.

This stream converter 134 on the playback side can be realized by the same construction as that of the stream converter 106 on the recording side. Also, since the process at that time is the same as that of the stream converter 106, a detailed description is omitted for simplicity.

In the stream conversion process on the playback side, it is necessary to perform error handling, before conversion, in accordance with an error flag by extra-code correction obtained by the ECC decoder 132. That is, when it is determined before conversion that there is an error in the middle of the macro block data, the DCT coefficients of the frequency components after the error place cannot be reconstructed. Accordingly, for example, the data at the error place is replaced with an end of block (EOB) code, and the DCT coefficients of the frequency components thereafter are set to zero. In a similar manner, also during high-speed playback, only the DCT coefficients up to the length corresponding to the sync block length are reconstructed, and the coefficients thereafter are replaced with zero data.

Since the DCT coefficients are arranged from the DC components and the low-frequency components to the high-frequency components through the DCT blocks, even if the DCT coefficients after a particular place are ignored in this manner, it is possible to cause the DCT coefficients to be spread all over the respective DCT blocks which constitute the macro block.

Also, for the input and output of the stream converter 134, a sufficient transfer rate (band width) is secured in advance in such a manner as to correspond to the maximum length of the macro blocks in the same way as on the recording side. When the length of the macro blocks is not limited, it is preferable that a band width three times as great as the pixel rate be secured.

The elementary stream output from the stream converter 134 is supplied to, for example, the SDTI transmission circuit 135 whereby the elementary stream is formed into a predetermined signal format with a synchronization signal being added and is output, as an elementary stream which complies with the MPEG2, to an output end 136.

Furthermore, the elementary stream output from the stream converter 134 can also be supplied to the MPEG decoder 137. Although not shown in the figure, the MPEG decoder 137 has the construction of an ordinary decoder which complies with the MPEG2. The elementary stream is decoded by the MPEG decoder 137 and is output, as a digital video signal, to an output end 138.

In the foregoing, although a description is given such that the present invention is applied to a case in which the DCT coefficients are zigzag-scanned for each DCT block, the present invention is not limited to this example. The present invention can also be applied to a case in which the DCT coefficients are alternately scanned for each DCT block.

Furthermore, in the foregoing, although a description is given such that the rearrangement of the DCT coefficients is started from the DCT block of the luminance signal Y, the present invention is not limited to this example, and the DCT block from which the rearrangement is started is arbitrary.

As has been described up to this point, according to the present invention, when video data is compressed and coded in accordance with an MPEG method and recorded on helical tracks on a magnetic tape, in the macro block, the DCT coefficients arranged in the sequence of the frequency components for each DCT block are rearranged into the sequence of the frequency components in such a manner as to extend across each DCT block. Therefore, even if high-speed playback in which the tape movement speed is higher than that during recording is performed during playback and only a part of the data of each helical track is played back, the DCT coefficient is provided from the DC-component side to each DCT block within the macro block. Thus, there is the advantage that a higher-quality playback image can be obtained by effectively utilizing data which is played back.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A signal processing apparatus for dividing each frame contained in video data into a plurality of macro blocks and for performing DCT on each of a plurality of DCT blocks contained in each divided macro block in order to create DCT coefficient data, said signal processing apparatus comprising conversion means for rearranging the arrangement of DCT coefficient data which is coded independently for each DCT block into the sequence from said coefficient data of a low order to said coefficient data of a high order in such a manner as to extend across a plurality of said DCT blocks within a macro block.

2. A signal processing apparatus according to one of claims 1, further comprising decoding means for decoding the arrangement of said DCT coefficient data which is variable-length-coded, wherein said conversion means rearranges said variable-length-coded DCT coefficient data on the basis of the decoding result by said decoding means.

3. A signal processing apparatus for processing DCT coefficient data which is created in such a way that each frame contained in video data is divided into a plurality of macro blocks and DCT is performed on each of a plurality of DCT blocks contained in each divided macro block, said signal processing apparatus comprising conversion means for rearranging the arrangement of said DCT coefficient data arranged in the sequence from low-order DCT coefficient data into said coefficient data of a high order in such a manner as to extend across a plurality of DCT blocks within a macro block into the sequence from said low-order coefficient data to said high-order coefficient data independently for each of said DCT blocks.

4. A signal processing apparatus according to claim 3, further comprising decoding means for decoding the arrangement of said DCT coefficient data which is variable-length-coded, wherein said conversion means rearranges said variable-length-coded DCT coefficient date on the basis of the decoding result by said decoding means.

5. A signal processing method for dividing each frame contained in video data into a plurality of macro blocks and for performing DCT on each of a plurality of DCT blocks contained in each macro block in order to create DCT coefficient data, said signal processing method comprising:

a conversion step for rearranging the arrangement of DCT coefficient data which is coded independently for each DCT block into the sequence from said coefficient data of a low order to said coefficient data of a high order in such a manner as to extend across a plurality of said DCT blocks within a macro block.

6. A signal processing method for processing DCT coefficient data which is created in such a way that each frame contained in video data is divided into a plurality of macro blocks and DCT is performed on each of a plurality of DCT blocks contained in each divided macro block, said signal processing method comprising:

a conversion step for rearranging independently for each of said DCT blocks, the arrangement of said DCT coefficient data arranged in the sequence from low-order DCT coefficient data into said coefficient data of a high order in such a manner as to extend across a plurality of DCT blocks within a macro block into the sequence from said low-order coefficient data to said high-order coefficient data.

7. A recording apparatus for recording DCT coefficient data which is created in such a way that each frame contained in video data is divided into a plurality of macro blocks and DCT is performed on each of a plurality of DCT blocks contained in each divided macro block, said recording apparatus comprising:

conversion means for rearranging the arrangement of DCT coefficient data which is coded independently for each DCT block into the sequence from said coefficient data of a low order to said coefficient data of a high order in such a manner as to extend across a plurality of said DCT blocks within a macro block;

packing means for performing packing by assigning said coefficient data rearranged by said conversion means to a fixed-length frame for each of said macro blocks and for packing in sequence the portion which extends outside said fixed-length frame into a portion which is unfilled in said fixed-length frame;

error-correction coding means for performing error-correction coding using a product code on data which is packed by said packing means and which corresponds to a plurality of said fixed-length frames; and recording means for recording data which is error-correction-coded by said error-correction coding means in a recording medium.

8. A recording apparatus according to claim 7, further comprising decoding means for decoding the arrangement of said DCT coefficient data which is variable-length-coded, wherein said conversion means rearranges said variable-length-coded DCT coefficient data on the basis of the decoding result by said decoding means.

9. A playback apparatus for playing back data recorded in a recording medium in such a way that each frame contained in video data is divided into a plurality of macro blocks, DCT is performed on each of a plurality of DCT blocks contained in each divided macro block in order to create DCT coefficient data, the DCT coefficient data is rearranged in the sequence from low-order DCT coefficient data to high-order DCT coefficient data in such a manner as to extend across a plurality of DCT blocks within a macro block, the rearranged DCT coefficient data is assigned to a fixed-length frame for each macro block, the portion which extends outside the fixed-length frame is packed in sequence into a portion which is unfilled in the fixed-length frame, and error-correction coding using a product code is performed on packed data which corresponds to a plurality of fixed-length frames, said playback apparatus comprising:

playback means for playing back data recorded in a recording medium;

error-correction means for performing error correction by decoding an error-correction code using a product code of said data played back by said playback means;

depacking means for reconstructing a macro block by concatenating corresponding macro blocks with respect to data on which error correction is performed by said error-correction means; and conversion means for rearranging independently for each of said DCT blocks, the arrangement of said DCT coefficients arranged in the sequence from low-order DCT coefficients to said high-order coefficients in such a manner as to extend across a plurality of DCT blocks within a macro block reconstructed by said depacking means into the sequence from said low-order coefficients to said high-order coefficients.

10. A playback apparatus according to claim 9, further comprising decoding means for decoding the arrangement of said variable-length-coded DCT coefficient data, wherein said conversion means rearranges said variable-length-coded DCT coefficient data on the basis of the decoding result by said decoding means.

11. A recording and playback apparatus which records, in a recording medium, DCT coefficient data which is created in such a way that each frame contained in video data is divided into a plurality of macro blocks and DCT is performed at intervals of a plurality of DCT blocks contained in each divided macro block in order to create DCT coefficient data, and which plays back DCT coefficients from the recording medium, said recording and playback apparatus comprising:

first conversion means for rearranging the arrangement of DCT coefficient data which is coded independently for each DCT block into the sequence from said coefficient data of a low order to said coefficient data of a high order in such a manner as to extend across a plurality of said DCT blocks within a macro block;

packing means for performing packing by assigning said coefficient data rearranged by said conversion means to a fixed-length frame for each of said macro blocks and for packing in sequence the portion which extends outside said fixed-length frame into a portion which is unfilled in said fixed-length frame;

error-correction coding means for performing error-correction coding using a product code on data which is packed by said packing means and which corresponds to a plurality of said fixed-length frames;

recording means for recording data which is error-correction-coded by said error-correction coding means in a recording medium;

playback means for playing back data recorded in said recording medium;

error-correction means for performing error correction by decoding an error-correction code using a product code of said data played back by said playback means;

depacking means for reconstructing a macro block by concatenating corresponding macro blocks with respect to data on which error correction is performed by said error-correction means; and second conversion means for rearranging independently for each of said DCT blocks, the arrangement of said DCT coefficients arranged in the sequence from low-order DCT coefficients to said coefficients of a high order in such a manner as to extend across a plurality of DCT blocks within a macro block reconstructed by said depacking means into the sequence from said low-order coefficients to said high-order coefficients.

12. A recording and playback apparatus according to claim 11, further comprising decoding means for decoding the arrangement of said variable-length-coded DCT coefficient data, wherein said first and second conversion means rearrange said variable-length-coded DCT coefficient data on the basis of the decoding result by said decoding means.

13. A stream processing apparatus for converting a source encoded stream into a stream suitable for variable-speed playback, said stream processing apparatus comprising:

extracting means for extracting a DCT coefficient from said source encoded stream by analyzing said source encoded stream;

rearranging means for rearranging the arrangement of DCT coefficients extracted by said source encoded stream into the sequence from a low order DCT coefficients to high order DCT coefficients in such a manner as to extend across a plurality of DCT blocks within a macro block having a low spatial frequency into a DCT coefficient having a high spatial frequency so that the arrangement of the DCT coefficients extracted from said source encoded stream becomes an arrangement suitable for variable-speed playback; and packing means for packing said rearranged DCT coefficients to a fixed-length frame.

14. A stream conversion method for converting a source encoded steam into a stream suitable for variable-speed playback, said stream processing method comprising the steps of:

extracting a DCT coefficient from said source encoded stream by analyzing said source encoded stream;

rearranging the arrangement of DCT coefficients extracted by said source encoded stream into the sequence from a low order DCT coefficients to high order DCT coefficients in such a manner as to extend across a plurality of DCT blocks within a macro block having a low spatial frequency into a DCT coefficient having a high spatial frequency so that the arrangement of the DCT coefficients extracted from said source encoded stream becomes an arrangement suitable for variable-speed playback; and packing said rearranged DCT coefficients to a fixed-length frame.

* * * * *